US006486298B1

(12) United States Patent
Jallouli et al.

(10) Patent No.: US 6,486,298 B1
(45) Date of Patent: Nov. 26, 2002

(54) DIEPISULFIDE BASED PREPOLYMERS AND THEIR USE IN THE OPTICAL FIELD

(75) Inventors: Aref Ben Ahmed Jallouli, Largo, FL (US); Joey Oliveros Obordo, Seminole, FL (US); Yassin Yusef Turshani, Largo, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 19 days.

(21) Appl. No.: 09/748,653

(22) Filed: Dec. 22, 2000

(51) Int. Cl.$^7$ ............................................. C08G 75/06
(52) U.S. Cl. .................. 528/374; 528/378; 528/379; 528/380; 524/792; 351/159
(58) Field of Search .................... 351/159; 528/378, 528/379, 380, 374; 524/792

(56) References Cited

U.S. PATENT DOCUMENTS

| | | | |
|---|---|---|---|
| 3,582,521 A | 6/1971 | Villa | 260/45.75 |
| 3,679,616 A | 7/1972 | Villa | 260/18 |
| 5,807,975 A | 9/1998 | Amagai et al. | 528/373 |
| 5,973,098 A | * 10/1999 | Keita | |

FOREIGN PATENT DOCUMENTS

| | | |
|---|---|---|
| DE | 1570447 | 9/1969 |
| EP | 0942027 | 3/1999 |
| EP | 1006374 | 11/1999 |
| JP | 11-256038 | * 9/1999 |
| WO | WO 00/26272 | 10/1999 |

* cited by examiner

Primary Examiner—David J. Buttner
(74) Attorney, Agent, or Firm—Fulbright & Jaworski L.L.P.

(57) ABSTRACT

A process for making a stabilized, liquid, diepisulfide based prepolymer having a viscosity at 25 C. ranging from 20 to 330000 centipoises which comprises polymerizing at room temperature a monomer composition comprising at least one diepisulfide monomer in the presence of at least one anionic polymerization initiator and at least one halogenated polymerization inhibitor and compositions made therefrom.

42 Claims, 1 Drawing Sheet

FIG. 1

DIEPISULFIDE BASED PREPOLYMERS AND THEIR USE IN THE OPTICAL FIELD

BACKGROUND OF THE INVENTION (1) Field of the Invention

The present invention relates to stabilized, liquid diepisulfide based prepolymers, a method for preparing such prepolymers, a method for polymerizing curing the prepolymers into final polymer materials and their lo application for making transparent optical articles such as ophthalmic lenses.

(2) Description of the Prior Art

Diepisulfide based resins are of major interest in the optical field owing to their high refractive indexes of 1.7 or more.

Document U.S. Pat. No. 5,807,975 discloses thermal polymerizaton and curing of diepisulfides, in particular for the manufacture of optical materials such as a lens material for spectacles. This thermal polymenzation/curing of diepisulfides lasts for several hours, generally about 20 hours.

Document EP-0.942.027 discloses an optical resin prepared by curing a polymerizable composition comprising a (thio)epoxy compound having at least one intramolecular disulfide bond The cuing catalysts which may be used arc typically tertiary amines, phosphines, Lewis acids, radical polymerization catalysts and cationic polymerization catalysts. Lengthy polymerization time are reported Document WO 00/26272 discloses a process for making thio containing resins which comprises polymerizing a composition comprising at least one diepisulfide compound and as polymerization catalyst, an alkaline metal, alkaline-earth metal or ammonium salt of an acid having a pKa ranging from 0.5 to 14.

Although, such a polymerization process leads to fast polymerization/curing of the composition, die process is very difficult to control due to the highly exothermic polymerization reaction and often results in a charred resin inappropriate for making optical articles such as ophthalmic lenses.

SUMMARY OF THE INVENTION

It has now been discovered that it is possible to safely prepare a liquid diepisulfide based prepolymer which is stable in time, the prepolymer being able to be later safely polymerized/cured into a transparent resin useful for making optical articles such as ophthalmic lenses.

Thus, an object of the present invention is a stabilized, liquid, diepisulfide based prepolymer useful for making transparent final resins.

It is another object of the present invention to provide a process for is making a stabilized, liquid, diepisulfide based prepolymer.

It is a further object of the present invention to provide a process for making a transparent optical article through fast polymerization/curing of a stabilized, liquid, diepisulfide based prepolymer.

These and other objects arc attained by providing a stabilized, liquid, diepisulfide base prepolymer having a viscosity at 25° C. ranging from 20 to 33000 cPs, preferably from 100 to 1000 cPs.

By a "stabilized" prepolymer there is meant a prepolymer the viscosity of which does not vary and particularly does not increase more than 20% when stored at 20° C. over a period of 7 days, preferably 10 days and more preferably one month.

By a "liquid" prepolymer there is meant a prepolymer which can be poured and cast into a casting mold such as a casting mold for making ophthalmic lenses.

DETAILED DESCRIPTION OF THE INVENTION AND PREFERRED EMBODIMENTS

The stabilized, liquid, prepolymers of the invention are prepared by polymerizing a monomer composition comprising at least one diepisulfide monomer in the presence of an anionic mitigator and a halogenated inhibitor.

Suitable diepisulfide monomers are diepisulfides of formula:

in which $R^1$ and $R^2$ are, independently from each other, H, alkyl, aryl, alkoxy, acyloxy, alkythio or arylthio; $R^3$ and $R^4$, independently from each other, where $R^a$ designates H, alkyl, aryl, alkoxy, aryloxy, alkythio or arylthio acid, n is an integer from 0 to 4 and m is an integer from 0 to 6.

$R^5$, $R^6$, $R^7$, $R^8$ each represents an hydrogen atom or a hydrocarbon group having 1 to 10 carbon atoms, and preferably a methyl group.

Preferably, each $R^5$, $R^6$, $R^7$, $R^8$ represents a hydrogen atom.

The preferred diepisulfide monomers are those having at least one intramolecular disulfide bond.

A preferred class of diepisulfide monomers is comprised of diepisulfide monomers of formula:

in which $R^1$, $R^2$, $R^3$ and $R^4$, are defmed as above.

In $R^1$, $R^2$, $R^3$, $R^4$ and $R^a$ the allyl and alkoxy groups are preferably $C_1$–$C_6$, more preferably $C_1$–$C_4$ alkyl and alkoxy groups such as methyl, ethyl, propyl, butyl, methoxy, ethoxy, propoxy and butoxy.

Specific examples of diepisulfide monomers are bis(2,3-epithiopropyl)disulfide, bis(2,3-epithiopropyldithio) methane, bis(2,3-epithiopropyldithio)ethane, bis(6,7-epithio-3,4-dithioheptane)sulfide, 1,4-ditian-2,5-bis(2,3-epithiopropyldithiomethyl), 1,3-bis(2,3-epithiopropyldithiomethyl)benzene, 1,6-bis(2,3-epithiopropyldithio)-2-(2,3-epithiopropyl-dithioethylthio)4-thiahexane and 1,2,3-tris(2,3-epithiopropyldithio)propane.

The preferred diepisulfide monomer is bis(2,3-epithiopropyl)disulfide.

The monomer compositions may comprise solely as polymerizable monomer a diepisulfide monomer of formula (I) or a mixture of such diepisulfide monomers or it may also include other polymerizable monomers.

These additional monomers are compounds having two or more functional groups capable of reacting with an episulfide group or compounds having one or more of these functional groups and one or more of other homopolymerizable groups.

These additional monomers include epoxy compounds, polythiols, unsaturated ethylenic compounds such as vinyl ether or (meth)acrylate compounds, polyvalent carboxylic acids and anhydrides, thiocarboxylic acids, thio alcohols, thiophenols, polyphenols, amines and amides.

Preferred additional monomers are polythiol, epoxy compounds, acrylate and (meth)acrylate compounds, especially polythiol compounds.

Among the preferred epoxy compounds there may be cited the compounds of formulas:

(III)

(IV)

where X is O or S, $R^b$ is H, alkyl or aryl and preferably alkyl or aryl, and $R_1$, $R^2$, $R^1$, $R^4$ m and n are defined as above.

Typical examples of the unsaturated ethylenic compounds include ethylene glycol dimethacrylate, propylene glycol dimethacrylate, tetramethylene glycol dimethacrylate, polyethylene glycol dimethacrylate, trimethylolpropane triacrylate, pentaerythritolpropane trimethacrylate, ethoxylated bisphenol A diacrylate, 1,6-hexanediol dimethacrylate, urethane diacrylate, epoxy diacrylate, diallylphthalate, and divinyl benzene.

The polythiol monomer may be any suitable polythiol having two or more, preferably two to four, thiol functions.

The polythiol monomers can be represented by formula:

(V)

In which n' is an integer from 2 to 6 and preferably 2 to 4, and R' is an organic group of valency equal to n'.

Useful polythiol monomers are those disclosed in EP-A-394.495 and U.S. Pat. No. 4,775,733 and the polythiols corresponding to the following formulas:

, and $C_2H_5C(CH_2COOCH_2CH_2SH)_3$

Among the preferred polythiol monomers there may be cited aliphatic polythiols such as pentaerythritol tetrakis mercaptoproprionate, 1-(1'mercaptoethylthio)-2,3-dimercaptopropane, 1-(2'-mercaptopropylthio)-2,3-dimercaptopropane, 1-(-3'mercaptopropylthio)-2,3 dimercaptopropane, 1-(4'mercaptopropylthio)-2, 3dimercaptopropane, 1-(5'mercaptopentylthio)-2,3 dimercaptopropane, -(6'-mercaptohexylthio)-2,3-dimercaptopropane, 1,2-bis(-4'-mercaptobutylthio)-3-dimercaptopropane, 1,2-bis(-5'mercaptopentylthio)-3-mercaptopropane, 1,2-bis(-6'-mercaptohexyl)-3-mercaptopropane, 1,2,3-tis(mercaptoethylthio)propane, 1,2,3-tis(-3'-mercaptopropyl-thio)propane, 1,2,3-tris(-2'-mercaptoethylthio)propane, 1,2,3-tris(4'-mercaptobutylthio)propane, 1,2,3-tris(-6'-mercaptohexylthio) propane, methanedithiol, 1,2-ethanedithiol, 1,1 propanedithiol, 1,2-propanedithiol, 1,3-propanedithiol, 2,2-propanedithiol, 1,1,hexanethiol-1,2,3propanetrithiol, and 1,2-bis(-2'-mercaptoethylthio)-3-mercaptopropane.

Among the preferred polythiols there may be cited polythiols of formulas:

and, mixtures thereof.

Examples of polythiol compounds include 1,2,3-trimethylolpropane tri(thioglycolate), pentaerythritol tetra (thioglycolate), pentaerythritol tetra(3-mercaptopropionate), 1,2,3-trimethylolpropane tri(3-mercaptoproprionate), thioglycerol, dithioglycerol, trithioglycerol, dipentaerythritol hexa(2-mercaptoacetate), and 3,4,5,6-tetrachloro-1,2-dimercapto benzene.

Among the (meth)acrylate compounds, there may be cited alkyl ($C_1$–$C_6$) (meth)acrylate such as methyl(meth)acrylate, ethyl(meth)acrylate, propyl(meth)acrylate and butyl(meth) acrylate.

The additional monomers usually represents 0 to 80% by weight preferably 0 to 50% by weight, of the total weight of polymerizable monomers present in the composition.

The composition may also include other optional ingredients classically used in the formulation of polymerizable compositions such as mold release agents, antioxidants, dyes and UV light absorbers. These and other ingredients may be employed in their customary amounts for their customary purposes.

The polymerizable monomer composition of the invention includes at least one anionic polymerizable initiator.

Such anionic polymerization initiators are salts of formula:

$$M_m^{p+} Y_n^- \tag{VI}$$

wherein $M^{p+}$ is a cation selected from the group consisting of alkaline metals, alkaline earth metals, transitions metals and ammonium groups of formula $NR'_4$ in which R is an alkyl radical, $Y^-$ is an anion such as the corresponding acid YH has a pKa fulfilling the condition $0.5 \leq pKa \leq 14$, p is the valency of the cation, and n=mxp.

The preferred metallic cation of the salts are $Li^+$, $Na^+$, $K^+$, $Rb^+$, $Mg^{2+}$, $Ca^{2+}$, $Ba^{2+}$ and $Al^{3+}$. The particularly preferred metallic cations are $Li^+$, $Na^+$, and $K^+$ due to their absence of color and solubility in the composition. Transition metals are less preferred because the salts thereof lead to colored compositions and therefore colored polymerized resins.

The preferred $NR'_4$ groups are those in which R is a $C_1$–$C_2$ allyl radical and more preferably, a methyl, ethyl, propyl, butyl or hexyl radical.

The salts shall be used in the polymerizable composition in an effective amount, i.e. an amount sufficient to promote the thermal or room temperature polymerization of the composition.

Generally, the salt will be present in amounts ranging, based on the total weight of the polymerizable monomers, from 5 to 10000 parts per million (ppm), preferably 100 to 5000 ppm.

Preferably, $Y^-$ is an anion such as the corresponding acid YH which fulfils the condition $0.5 \leq pKa \leq 10$ and more preferably $0.5 \leq pKa \leq 8$.

Preferably, the anion $Y^{31}$ is selected from the group consisting of thiocyanate, carboxylate, thiocarboxylate, acetylacetonate, diketone, acetoacetic, ester, malonic, ester, cyanoacetic ester, ketonitrile and anion of formula $RS^-$ wherein R is a substituted or non-substituted alkyl group or phenyl group.

Preferably, the alkyl group is a $C_1$–$C_6$ alkyl group, such as methyl, ethyl and propyl.

The preferred anions $Y^-$ are $SCN^-$; acetylacetonate, acetate, thioacetate, formate and benzoate.

Examples of pKa (acid/base) corresponding to the polymerization initiators are given in the table below:

| ACID | ANION | Pka |
|---|---|---|
| HSCN | $SCN^-$ | 0.85 |
| HCOOH | $HCOO^-$ | 3.8 |
| $C_6H_5COOH$ | $C_6H_5COO^-$ | 4.2 |
| $CH_3COOH$ | $CH_3COO^-$ | 4.8 |
| $C_6H_5SH$ | $C_6H_5S^-$ | 7.8 |
| $CH_3COCH_2COCH_3$ | $CH_3CO^-CHCOCH_3$ | 9 |

Preferred polymerization initiators are KSCN and MeCOOK.

The polymerization initiator preferably also further includes at least one electro-donor compound.

The electro-donor compound is preferably a crown-ether.

The preferred crown-ethers may be represented by formula:

(VII)

where $R^9$ and $R^{10}$ are polymethylene groups, preferably methylene or ethylene groups, and x is an integer from 3 to 6.

Preferred crown-ether is 1,4,7,10,13,16-hexaoxacycloctadecane (18-crown-6).

The electro-donor compounds are present based on total weight of the polymerizable monomers present in the composition in amounts ranging from 0 to 6%, preferably from 0.03 to 3% by weight.

Generally, the molar ratio ranges from 1 to 10.

The polymerization initiator is preferably introduced in the polymerizable composition as a solution in a solvent.

Appropriate solvents are alcohols, such as alcanols and mercaptoalcanols, ketones such as acetone, acetonitrile, dimethylsulfoxide and tetrahydrofuran. Preferred solvent is 2-mercaptoethanol.

The polymerizable composition also contains at least one halogenated polymerization inhibitor.

By polymerizaton inhibitor, it is meant a compound which decreases the rate of polymerization of a given polymerizable composition when compared to a similar polymerizable composition free of such polymerization inhibitor.

The halogenated inhibitor may be a chlorinated, a brominated, a iodinated or a mixed halogenated compound.

The halogenated inhibitor may be represented by the following formula:

$$R(A)_y \tag{VIII}$$

In which R is a carbon atom, or a hydrocarbon group such as an alkyl radical or an aromatic radical, A is an halogen or a halogeno alkyl radical and y is an integer from 1 to 4, preferably from 1 to 2.

The preferred halogenated inhibitors may be represented by formula:

$$A_1-(CH_2X)_Z \tag{IX}$$

where $A_1$ is an aryl radical eventually substituted, such as a phenyl, naphtyl, anthryl or biphenyl radical, X is a halogen atom such as I, Br or Cl, and z is a integer from 1 to 4, preferably 1 to 2.

Among the preferred halogenated inhibitors there may be cited:

The most preferred halogenated inhibitor is:

Benzyl chloride

The amount of halogenated inhibitor used may vary depending upon the to monomers and the initiators used to formulate the polymerizable composition as well as the desired rate of polymerization. However, the amount of halogenated inhibitor shall be sufficient to avoid charting of the polymerizable composition.

Usually, the amount of inhibitor present in the polymerization composition expressed as the molar ratio of halogenated inhibitor to the polymerization initiator (with the exclusion of the electro-donor compound) will range from 0.1 to 350, preferably from 1 to 50, and more preferably from 1 to 10.

The monomer compositions may also include a variety of adjuvants such as photostabilizers, UV absorbents, antioxidants, anti-coloring agents, dyes, fillers and internal mold release agents in the usual proportions.

The prepolymer synthesis, i.e. polymerization of the monomer composition can be carried out in bulk, in solution, in suspension or in emulsion.

Polymerization of the monomer compositions is preferably carried out in bulk at room temperature, by simply adding together the different ingredients of the compositions under sting, then letting the polymerization proceed with or without stirring. Preferably the halogenated inhibitor is added to the monomer prior to the addition of the polymerization initiator.

As previously mentioned the prepolymers of the invention have a viscosity at 25° C. ranging from 20 to 33000 centipoises, preferably 100 to 1000 centipoises.

All viscosity measurements are made with the same viscosimeter (Brookfield LVDVT) and following the same protocole but using S18 spindle for monomers and prepolymers of law viscosity (20 to 1000 cPs) and S31 spindle for prepolymers of higher viscosity ($\geq$5000 and up to 50000 cPs).

Selection of spindle speed is made as follows:

For any given spindle/speed combination, the maximum range is equal to the spindle factor multiplied by 100 and the minimum range equals the factor multiplied by 10.

For the S-18 spindle, sample size is 8.0 ml and spindle factor is 30/N where N is the spindle speed (rpms) and for S-31 spindle, sample size is 10.0 ml and the spindle factor 300/N.

Thus, using S-18 spindle at 2.5 rpms the spindle factor will be 30/2.5=12 and the viscosity range 120 cPs to 1200 cPs.

Range efficiency (%) corresponds to the ratio of the measured viscosity for the sample divided by the maximum range and multiplied by 100. The higher the range efficiency, the more accurate is the viscosity measurement. Acceptable range efficiency is 10% to 99.9%.

Optimization of spindle speed may be effected as follows:

Assuming that at a spindle speed of 1.5 rpms the range efficiency is only 33.8%, doubling the spindle speed to 3.0 rpms would give a range efficiency of 67.6%. Further increasing the spindle speed from 3.0 to 4.0 rpms would give a 25% increase of the range efficiency to 84.5%. But an increase of spindle speed from 4.0 to 5.0 rpms would give a 20% increase of the range efficiency to 101.4% which is an error (reading exceeds the 100% limit). Therefore, the viscosity measurements will be taken at a speed of 4 rpms with approximately a 84.5% range efficiency.

All viscosity measurements are made at 25° C.

All refractive index measurements are made at 25° C. using sodium D line 589 nm.

The prepolymers of the invention can be safely cured into a transparent resin, in bulk polymerization.

Curing may be effected by simply heating the prepolymer or a mixture of the prepolymers at a temperature up to 80° C., preferably ranging from 40 to 80° C.

Curing can be conducted at room temperature by incorporating an additional amount of the polymerization initiator or another initiator to the prepolymer or mixture of prepolymers. The amount of additional or other polymerization initiator may vary depending upon the desired rate of curing but must be such that charring is avoided. This amount usually ranges from 100 to 2000 ppm.

Alternatively, initial raw monomers such as diepisulfides and/or polythiols as well as an additional amount of the polymerization initiator or another initiator can be added to the prepolymer or mixture of prepolymers, and the resulting composition can be cured at room temperature.

The amount of raw monomers that is usually added will range from 5 to 95%.

The additional amounts of polymerization initiator as previously indicated may be widely varied, but usually will range from 100 to 2000 ppm.

Curing time up to the obtention of a gel usually ranges from 5 to 30 minutes.

Curing may be effected in a mold, such as a two parts mineral glass mold for obtaining an optical article such as an ophthalmic lens.

Whenever necessary, a mixing apparatus may be used for either the mixing step of the monomer components of the monomer composition leading to the prepolymer of the invention or the mixing steps of raw monomers or additives with the prepolymer of the invention.-

Static mixers, small reactors with magnetic bar, mechanical mixers, screw mixers or ultrasonic mixing system may be used.

A screw mixer is preferably used.

In a preferred embodiment, the components to be mixed are added inside a small reactor chamber and then mixed with a screw mixer.

The following examples illustrate the present invention. In these examples, unless otherwise stated, all parts and percentage are by weight Examples 1 to 13 and Comparative Example C1

These examples illustrate the preparation of the prepolymers of the invention.

Several prepolymers were prepared by bulk polymerizing bis(2,3-epithiopropyl)disulfide using mixtures of MeCOOK and 18.crown.6 as the polymeriztion initiator in the presence of various amounts of benzylechloride as the inhibitor and eventually with various amounts of polythiols.

The polymerization initiator was added in the form of a solution in 2-mercaptoethanol.

Addition of the different ingredients and polymerization were made at room temperature. Magnetic stirring was used during the additions and stopped once the last ingredient added.

All polymerizations were done using 10 g samples of bis(2.3-epithiopropyl)disulfide.

Compositions and results are given in Table I:

TABLE I

| Run N° | Polythiol A (% by weight) | MeCOOK (ppm) | Molar ratio BzCl/MeCOOK | Results Time |
|---|---|---|---|---|
| 1 | — | 52 | 0.142 | Clear liquid after 6 days |
| 2 | — | 43 | 0.331 | Clear liquid after 6 days |
| 3 | — | 61 | 0.422 | Clear liquid after 6 days |
| 4 | — | 51 | 1.004 | Clear liquid after 6 days |
| 5 | — | 49 | 1.572 | Clear liquid after 6 days |
| 6 | — | 54 | 1.904 | Clear liquid after 10 days |
| 7 | — | 58 | 3.543 | Clear liquid after 10 days |
| 8 | — | 34 | 12.762 | Clear liquid after 10 days |
| 9 | — | 313 | 37.532 | Clear liquid after 31 days |
| 10 | — | 287 | 347.300 | Clear liquid after 31 days |
| 11 | 10.53 | 308 | 2.039 | Slightly yellow viscous liquid after 37 days |
| 12 | 10.18 | 300 | 5.324 | Slightly viscous liquid After 5 days |
| 13 | 10.98 | 321 | 8.843 | Cloudy liquid/ after 37 days |
| C1 | — | 304 | 0 | Char after 50–86 min. |

In runs 1 to 8 there was used 0.05–0.09% by weight of 2-mercaptoethanol solvent) and the molar ratio of 18-crown-6 to MeCOOK was 2.256.

In runs 9 to 13 and C1 there was used 0.5 to 0,6% by weight of 2-mercapto ethanol and the molar ratio of 18-crown-6 to the MeCOOK was 2.4.

In all runs there were added 0.4–0.5 ppm of Blue dye.

Polythiol A is a mixture of the following three polythiols in the respective weight percent amounts (molar amounts).

Such polythiol A is described in U.S. Pat. No. 5,837,797 (example 1).

Blue dye: 1,4-[(2,6dibromo-4-methylphenyl)amino]-1.4-anthracenedione (also known as Morplas Violet 3B)

BzCl:Benzyl chloride

The liquid prepolymers made are perfectly miscible with the starting raw monomers.

Examples 14 and 15 and Comparative Example C'1

Prepolymers were prepared by bulk polymerizing bis(2,3-epithiopropyl)disulfide and polythiol A using a mixture of MeCOOK and 18-crown-6 as initiator and $CCl_4$ as inhibitor in the presence of 2-ethylhexanoic acid.

The initiator was added in the form of a solution in 2mercaptoethanol.

Compositions, polymerization conditions and results are given in Table II.

Polymerizations were done using 10 g samples of bis(2,3-epithiopropyl)disulfide.

TABLE II

| Run N° | Molar ratio 2-ethylhexanoic/MeCOOK | Polythiol A (%) | CCl₄ (%) | T(° C.) | Stirred | Result | Time |
|---|---|---|---|---|---|---|---|
| 14 | 1.062 | 10.39 | 1.91 | RT | No | Liquid | 42 days |
| 15 | 1.028 | 10.18 | 1.92 | 40° C. | No | Liquid | 42 days |
| Comparative C.° 1 | 1.152 | 10.41 | 0 | RT | No | Gel | 1–16 hours |

The amount of MeCOOK was 295–325 ppm, the molar ratio 18-crown-6/Me COOK was 2.4 and the amount of 2-mercapto ethanol was 0.5–0.6%. RT=Room temperature (20° C.).

Examples 16 to 26

Eleven prepolymers were prepared by polymerizing bis(2,3-epithiopropyl)disulfide using mixtures of MeCOOK and 18-crown-6 as initiator in the presence of different amounts of benzyl chloride as the inhibitor.

The polymerization initiator was added as a solution in 2-mercaptoethanol.

Addition of the different ingredients was made at room temperature under stirring. Polymerization was made at room temperature without stirring.

All polymerizations were done using 100 g samples of bis(2,3-epithiopropyl)disulfide.

Viscosities of the prepolymers were measured as previously described.

Compositions and results are given in Table III.

In runs 25 and 26 there were used 0.1% by weight of 2-mercaptoethanol and 0.5 ppm of Blue dye. Molar ratio of BzCl to Me COOK was 2.3 and the mixture was stirred during the polymerization.

The results show that the viscosity of the prepolymer increases with time stabilize within 4 days. The final viscosity decreases with increasing amounts inhibitor.

Examples 27 to 29

These examples illustrate the influence of the stirring and of the polymerization temperature on the resulting prepolymers.

Three prepolymers were prepared by polymerizing bis(2,3-epithiopropyl)disulfide using mixtures of MeCOOK and 18-crown-6 as initiator in the presence of different amount of benzylechloride as the inhibitor.

The polymerization initiator was added as a solution in 2-mercaptoethanol.

Polymerization was effected either at room temperature or above with or without stirring.

All polymerizations were done using 100 g samples of bis(2,3-epithiopropyl)di sulfide.

TABLE III

| Run N° | Polythiol A (% by weight) | MeCOOK (ppm) | Molar ratio BzCl/MeCOOK | Viscosity (cPs) | | |
|---|---|---|---|---|---|---|
| 16 | — | 300 | 2.100 | 245 (1 day) | 298 (4 days) | 299 (7 days) |
| 17 | — | 302 | 4.091 | 59 (1 day) | 73 (4 days) | 74 (7 days) |
| 18 | — | 300 | 6.264 | 35 (1 day) | 44 (4 days) | 44 (7 days) |
| 19 | 5.057 | 303 | 2.127 | 91 (1 day) | 167 (4 days) | 175 (7 days) |
| 20 | 5.052 | 301 | 4.079 | 37 (1 day) | 49 (4 days) | 51 (7 days) |
| 21 | 5.052 | 302 | 5.815 | 35 (1 day) | 40 (4 days) | 41 (7 days) |
| 22 | 10.009 | 301 | 2.099 | 253 (1 day) | 323 (5 days) | 320 (8 days) |
| 23 | 10.020 | 301 | 4.059 | 47 (1 day) | 53 (5 days) | 54 (8 days) |
| 24 | 10.036 | 301 | 6.066 | 37 (1 day) | 39 (5 days) | 40 (8 days) |
| 25 | — | 51 | 0.526 | 51 (3 days) | 49 (6 days) | 49 (10 days) |
| 26 | — | 48 | 0.139 | 60 (1 day) | 64 (3 days) | 67 (7 days) |

In runs 16–24, there were used 0.5% by weight of 2-mercaptoethanol and 0.5 ppm of Blue dye. The molar ratio of 18-crown-6 to MeCOOK was 2.4. There was no stirring during the polymerization.

Viscosities of the prepolymers were measured as previously described.

Compositions and results are given in table (IV).

TABLE IV

| Run N° | MeCOOK (ppm) | Molar ratio 18-crown-6/MeCOOK | Molar ratio BzCl/MeCOOK | 2-mercapto-ethanol (%) | Stirring | T(° C.) | Viscosity | | |
|---|---|---|---|---|---|---|---|---|---|
| 27 | 309 | 2.205 | 2.124 | 0.5 | Yes | 20 | 260 (1 day) | 281 (2 days) | 282 (7 days) |
| 28 | 300 | 2.400 | 2.100 | 0.5 | No | 20 | 245 (1 day) | 248 (4 days) | 299 (7 days) |
| 29 | 308–309 | 2.205 | 2.058 | 0.5 | Yes | 40 | 1152 (1 day) | 1291 (2 days) | 1830 (7 days) |

These examples show that stirring increases the rate of obtention of a stable prepolymer. Increasing the temperature increases the viscosity which keeps increasing with time without reaching a stable value.

Examples 30 to 34

These examples show the influence of the order of addition of the different reactants.

Several runs were carried out on 100 g batches of bis(2,3-epithiopropyl)disulfides using different orders of addition of the reactants. Compositions, order of addition of the reactants and results are given in Table V.

The results show that the reaction is best controlled when benzyl chloride is first added to the monomer, followed by the initiator (run 34). The mixing upon addition is also important. It is worth noticing the lower reactivity of the system where the initiator solution was first mixed with benzyl chloride prior to addition to the monomer (run 33). The differences in the final viscosity of runs 32, 31 and 33 are probably due to differences in the amounts of benzyl chloride used rather than differences in the order of addition of the reactants.

TABLE V

| Run N° | BzCl | Order of addition | Tmax (° C.) | Viscosity (cPs) |
|---|---|---|---|---|
| 30 | 3.001 | 1) 0.6215 BDS<br>2) 58.7193 gM<br>3) 0.1210 g BzCl<br>4) 0.6999 g initiator<br>5) 40.66 g M (S) | 49.7 @ 15 min | 2541 @ 116 hrs |
| 31 | 3.338 | 1) 0.3117 g BDS<br>2) 2.3932 g M (S)<br>3) 10.0004 g M (S)<br>4) 0.6861 g initiator<br>5) 0.1319 BzCl<br>6) 87.89 g M (S) | 31.7 @ 40 min | 516 @ 92 hrs<br>566 @ 140 hrs |
| 32 | 3.243 | 1) 0.3104 g BDS<br>2) 12.3970 g M (S)<br>3) 0.1271 g BzCl (S)<br>4) 0.6805 g M (S)<br>5) 87.9 g M (S) | 31.5 @ 40 min | 521 @ 20 hrs<br>578 @ 48 hrs |
| 33 | 3.571 | 1) 0.3175 g BDS<br>2) 12.3946 g M (S)<br>3) [0.6831 g initiator + 0.1405 g BzCl (S)] (S)<br>4) 88.00 g M (S) | ≈26 @ 30 min | 237 @ 20 hrs<br>263 @ 48 hrs |
| 34 | 3.756 | 1) 0.3077 g BDS<br>2) 100.42 g M (S)<br>3) 0.1486 g BzCl (S)<br>4) 0.6869 g MeCOOK (S) | 35.5 @ 45 min | 203 @ 1.87 hrs<br>418 @ 28 hrs |

BDS : solution made from 0.0037 g Blue Dye + 22.9947 g bis(2,3-epithioproyl)disulfide
Initiator : solution made from 0.3914 g MeCOOK + 2.3557 g (18,6) crown + 6.0181 g 2-mercaptoethanol
S : Stirred
M : bis(2,3-epithiopropyl)disulfide.

Examples 35 to 38

Four prepolymers were synthesized at room temperature using 100 g batches of bis(2,3-epithiopropyl)disulfide monomer and different amounts of benzyl chloride. They were characterized by their viscosity and refractive index.

Compositions and results are given in Table VI:

TABLE VI

| Run[a] N° | BzCl/MeCOOK | Viscosity (cPs) @ 4 days | Viscosity (cPs) @ 19 days | $N_D$ @ 4 days | $N_D$ @ 19 days |
|---|---|---|---|---|---|
| 36 | 2.224 | 29400[b] | 28020[c] | 1.6866[b] | 1.6865[c] |
| 37 | 4.191 | 257 | 257 | 1.6656 | 1.6658 |
| 38 | 6.400 | 101 | 102 | 1.6587 | 1.6590 |
| 39 | 8.160 | 74 | 71 | 1.6559 | 1.6562 |

[a] All runs contained : [MeCOOK] ≈ 305 ppm, [(18,6)] ≈ 1832 ppm, [2-mercaptoethanol] ≈ 0.47%
[b] At 5 days
[c] At 18 days The refractive index of the prepolymers at 25° C. decreases when the ratio BzCl/MeCOOK used increases. The values of refractive index are about the same between 4 and 19 days, which indicates that the prepolymers made are stable.

The viscosity of the prepolymers at 25° C. decreases when the ratio BzCl/MeCOOK used increases. The values of viscosity are about the same between 4 and 19 days, which indicates that the prepolymers made are stable.

Examples 39 to 47

A series of nine chlorinated aromatics was evaluated as inhibitors, including benzyl chloride. All of them gave stable and clear prepolymers, except α, αdichlorotoluene that gave a char.

In all runs, there were used 300 ppm MeCOOK, 1800 ppm of 18-crown-6 and 0.45% of 2-mercaptoethanol.

Different amounts of inhibitors were used as indicated by the molar ratios inhibitor/MeCOOK of Table VII. Results are also given in Table VII.

TABLE VII

| Run N° | Inhibitor | Molar ratio Inhibitor/MeCOOK | Experimental Refractive index @ 7 days | Calculated viscosity (cPs) |
|---|---|---|---|---|
| 39 | Benzyl chloride | 2.019 | 1.6868 | 30070 |
|  |  | 4.153 | 1.6659 | 285 |
|  |  | 7.634 | 1.6567 | 76 |
| 40 | 1,2-bis(chloromethyl) benzene | 2.934 | 1.6546 | 59 |
|  |  | 4.037 | 1.6522 | 44 |
|  |  | 8.891 | 1.6478 | 28 |
| 41 | 1,3-bis(chloromethyl) benzene | 2.134 | 1.6760 | 1928 |
|  |  | 4.616 | 1.6588 | 99 |
|  |  | 7.756 | 1.6528 | 48 |
| 42 | 1,4-bis(chloromethyl) benzene | 1.829 | 1.6708 | 673 |
|  |  | 3.648 | 1.6607 | 129 |
|  |  | 8.539 | 1.6516 | 42 |
| 43 | 4,4-bis(chloromethyl)1,1-biphenyl | 2.122 | 1.6676 | 378 |
|  |  | 4.506 | 1.6559 | 68 |
|  |  | 7.503 | 1.6474 | 27 |
| 44 | 2-chloromethyl phenyl isocyanate | 1.836 | 1.6450 | 22 |
|  |  | 4.030 | 1.6446 | 21 |
|  |  | 8.742 | 1.6447 | 21 |
| 45 | 4-chloromethyl phenyl isocyanate | 2.363 | 1.6472 | 27 |
|  |  | 4.368 | 1.6454 | 22 |
|  |  | 7.383 | 1.6453 | 22 |
| 46 | 1-chloromethyl 2,4-diisocyanatobenzene | 2.821 | 1.6447 | 21 |
|  |  | 4.512 | 1.6449 | 21 |
|  |  | 7.688 | 1.6454 | 22 |
| 47 | α, α dichlorotoluene | 3.052 | — | — |
|  |  | 3.272 | — | — |
|  |  | 8.537 | — | — |

Figure 1:
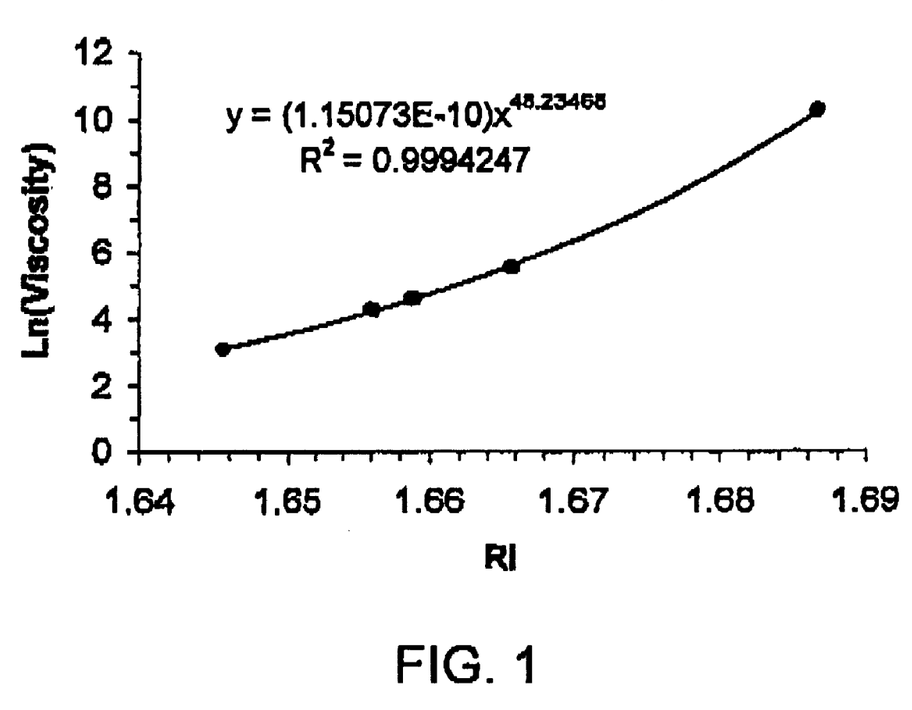
The FIGURE shows the relationship between viscosity and refractive index.

Calculated viscosities were determined using the graph of FIG. 1 which is a graph of Ln(viscosity) as a function of the refractive index.

Example 48 to 51

These examples illustrate the use of the prepolymers of the invention for making cured transparent resins.

Samples of 10 g were prepared and placed in glass vials by adding to a prepolymer of the invention various amounts of polythiol A and MeCOOK. The prepolymers used contain 99.24% by weight bis(2,3-epithiopropyl)disulfide, 308 ppm MeCOOK, 1827 ppm 18-crown-6, 0.47% by weight 2mercaptoethanol, 820 ppm of benzyl chloride and 0,5 ppm of Blue dye.

The mixture was stirred magnetically for about 10 s, then kept at room temperature with no stirring.

The amounts of reactants and the results are given in Table VIII.

TABLE VIII

| Run N° | Pre-polymer (%) | Polythiol A (%) | Added [MeCOOK] (ppm) | Result | Gel Time |
|---|---|---|---|---|---|
| 48 | 88.7 | 10.4 | 77 | Gel | >24 hrs |
| 49 | 88.3 | 10.3 | 307 | Gel | <24 hrs |
| 50 | 88.2 | 10.2 | 355 | Gel | <24 hrs |
| 51 | 88.0 | 10.4 | 405 | Yellow gel | 8 min |

Examples 52 to 54

A mixture was prepared using the same prepolymer as in examples 47 to 50 and adding to this polymer, polythiol A and MeCOOK. The amounts of the reactants are indicated in Table IX.

This mixture was used to form 2 mm thick flat lenses having a diameter of 85 mm using a classical two parts mineral glass mold.

The lenses were cured 1 hour at 80° C. The resulting lenses are perfectly clear.

TABLE IX

| Run N° | Prepolymer (%) | MR10B (%) | Added [MeCOOK] (ppm) | Gel Time (min) |
|---|---|---|---|---|
| 52 | 88.7 | 9.7 | 413 | 60 |
| 53 | 88.4 | 9.6 | 537 | 40 |
| 54 | 87.6 | 9.7 | 871 | 11 |

What is claimed is:

1. A stabilized, liquid, diepisulfide based prepolymer having a viscosity at 25° C. ranging from 20 to 33000 centipoises.

2. The prepolymer of claim 1, wherein the viscosity at 25° C. ranges from 100 to 1000 centipoises.

3. The prepolymer of claim 1 resulting from the polymerization in the presence of an anionic polymerization initiator and a halogenated polymerization inhibitor of a monomer composition comprising at least one diepisulfide monomer of formula:

in which $R^1$ and $R^2$ are, independently from each other, H, alkyl, amyl alkoxy, aryloxy, alkythio or arylthio; $R^3$ and $R^4$, independently from each other represent:

where $R^a$ designates H, alkyl, amyl, alkoxy, aryloxy, alkythio or arylthio acid, n is an integer from 0 to 4 and m is an integer from 0 to 6 and $R^5$, $R^6$, $R^7$, $R^8$ each represents a hydrogen atom or a hydrocarbon group having 1 to 10 carbon atoms.

4. The prepolymer or claim 3, wherein said at least one diepisulfide is a diepisulfide of formula:

in which $R^1$, $R^2$, $R^3$ are as defined in claim 3.

5. The prepolymer of claim 3, wherein said at least one diepisulfide is to selected from bis(2,3-epithiopropyl) disulfide, bis(2,3-epithiopropyl-dithio)methane, bis(2,3-epithiopropyldithio)ethane, bis(6,7-epithio-3,4-dithioheptane)sulfide, 1,4-dithan-2,5-bis(2,3-epithiopropyldithiomethyl), 1,3-bis(2,3-epithiopropyl-dithiomethyl)benzene, 1,6-bis(2,3-epithiopropyldithio)-2-(2,3-epithiopropyl-dithioethylthio)-4-thiahexane and 1,2,3-tris(2,3-epithiopropyldithio)propane.

6. The prepolymer of claim 3, wherein said at least one diepisulfide is bis(2,3-epthiopropyl)disulfide.

7. The prepolymer of claim 3, wherein the monomer composition further comprises at least one polythiol.

8. The prepolymer of claim 7, wherein said at least one polythiol is represented by formula:

$$R'(SH)_{n'} \qquad (V)$$

In which n' is an integer from 2 to 6 and R' is an organic group of valency equal to n'.

9. The prepolymer of claim 8, wherein said at least one polythiol is selected from polythiols of formulas:

and, mixtures thereof.

10. The prepolymer of claim 3, wherein the anionic polymerizaton initiator comprises a salt of formula:

$$M_m^{p+} Y_n^-  \qquad (VI)$$

wherein $M^{p+}$ is a cation selected from the group consisting of alkaline metals, alkaline earth metals, transitions metals and ammonium groups of formula $NR^+_4$ in which R is an alkyl radical, $Y^-$ is an anion such as the corresponding acid YH has a pKa fulfilling the condition $0.5 \leq pKa \leq 14$, is the valency of the cation, and $n = m \times p$.

11. The prepolymer of claim 10, wherein the anionic polymerization initiator is MeCOOK or KSCN.

12. The prepolymer of claim 3, wherein the halogenated polymerization inhibitor comprises a compound of formula:

where $A_1$ is an aryl radical eventually substituted, X is a halogen atom and z is an integer of 1 to 4.

13. The prepolymer of claim 3, wherein the halogenated polymerization is inhibitor is selected from:

14. The prepolymer of claim 13, wherein the halogenated polymerization inhibitor is benzyl chloride.

15. A process for making a stabilized, liquid, diepisulfide based prepolymer having a viscosity at 25° C. ranging from 20 to 33000 centipoises which comprises polymerizing at room temperature a monomer composition comprising at least one diepisulfide monomer in the presence of at least one anionic polymerizing initiator and at least one halogenated polymerization inhibitor.

16. The process of claim 15, wherein the halogenated polymerization inhibitor is added to the monomer composition prior to the addition of the anionic polymerization inhibitor.

17. The process of claim 15, wherein said at least one diepisulfide is a diepisulfide of formula:

in which $R^1$, $R^2$, $R^3$ are as defined in claim 3.

18. The process of claim 15, wherein said at least one diepisulfide is selected from bis(2,3-epithiopropyl)disulfide, bis(2,3-epithiopropyl-dithio)methane, bis(2,3-epithiopropyldithio)ethane, bis(6,7-epithio-3,4-dithioheptane)sulfide, 1,4-dithan-2,5-bis(2,3-epithiopropyldithiomethyl), 1,3-bis(2,3-epithiopropyl-dithiomethyl)benzene, 1,6-bis(2,3.epithiopropyldithio)2-(2,3-epithiopropyl-dithioethylthio)4-thiahexane and 1,2,3-tis(2,3-epithiopropyldithio)propane.

19. The process of claim 15, wherein said at least one diepisulfide is to bis(2,3epthiopropyl)disulfide.

20. The process of claim 15, wherein the monomer composition further comprises at least one polythiol.

21. The process of claim 15, wherein said at least one polythiol is represented by formula:

In which n' is an integer from 2 to 6 and R' is an organic group of valency equal to n'.

22. The process of claim 15, wherein said at least one polythiol is selected from polythiols of formulas:

and, mixtures thereof.

23. The process of claim 15, wherein the anionic polymerization initiator comprises a salt of formula:

wherein $M^{P+}$ is a cation selected from the group consisting of alkaline metals, alkaline earth metals, transitions metals and ammonium groups of formula $NR^+_4$ in which R is an alkyl radical, $Y^-$ is an anion such as the corresponding acid YH has a pKa fulfilling the condition $0.5 \leq pKa \leq 14$, p is the valency of the cation, and $n = m \times p$.

24. The process of claim 15, wherein the anionic polymerization initiator is MeCOOK or KSCN.

25. The process of claim 23, wherein the anionic polymerization initiator further comprises a crown-ether.

26. The process of claim 25, wherein the crown-ether is 18-crown-6.

27. The process of claim 15, wherein the halogenated polymerization inhibitor comprises a compound of formula:

$$A_1-(CH_2X)_z \quad (IX)$$

where $A_1$ is an aryl radical eventually substituted, X is a halogen atom and z is an integer of 1 to 4.

28. The process of claim 15, wherein the halogenated polymerization inhibitor is selected from:

29. The process of claim 15, wherein tie halogenated polymerization inhibitor is benzyl chloride.

30. The process of claim 15, wherein the amount of anionic polymerization initiator present ranges from 5 to 10000 ppm based on the total weight of polymerizable monomers.

31. The process of claim 15, wherein the molar ratio of the halogenated inhibitor to the polymerization initiator ranges from 0.1 to 350.

32. A process for making a cured, transparent, diepisulfide based resin which comprises:
   obtaining a stabilized, liquid, diepisulfide based prepolymer having a viscosity at 25° C. ranging from 20 to 33000 centipoises;
   adding to the prepolymer an effective amount of an anionic polymerization initiator; and
   bulk polymerizing the prepolymer at least up to the obtention of a gel.

33. The process of claim 32, wherein bulk polymerization is carried out at room temperature.

34. The process of claim 33, wherein bulk polymerization up to the obtention of a gel lasts for 5 to 30 minutes.

35. The process of claim 32 which further comprises adding diepisulfide monomer and/or polythiol monomer prior to the bulk polymerization.

36. The process of claim 35, wherein bulk polymerization is carried out at room temperature.

37. The process of claim 36, wherein bulk polymerization up to the obtention of a gel lasts for 5 to 30 minutes.

38. The process of claim 32, wherein bulk polymerization is carried out in a lens casting mold.

39. The process of claim 35, wherein bulk polymerization is carried out in a lens casting mold.

40. The prepolymer of claim 8, wherein n' is an integer from 2 to 4.

41. The process of claim 21, wherein n' is an integer from 2 to 4.

42. A process for making a cured, transparent, diepisulfide based resin which comprises:
   obtaining a stabilized, liquid, diepisulfide based prepolymer having a viscosity at 25° C. ranging from 20 to 33000 centipoises;
   adding to the prepolymer an effective amount of an anionic polymerization initiator;
   bulk polymerizing the prepolymer with heating at least up to the obtention of a gel.

\* \* \* \* \*

UNITED STATES PATENT AND TRADEMARK OFFICE
CERTIFICATE OF CORRECTION

PATENT NO. : 6,486,298 B1
DATED : November 26, 2002
INVENTOR(S) : Jallouli et al.

It is certified that error appears in the above-identified patent and that said Letters Patent is hereby corrected as shown below:

Title page,
Item [57], ABSTRACT,
Line 2, please delete "25 C." and insert -- 25ºC -- therefor.
Line 3, please delete "330000" and insert -- 33000 -- therefor.

Column 15,
Line 66, please delete "amyl" and insert -- aryl -- therefor.

Column 16,
Line 8, please delete "amyl" and insert -- aryl -- therefor.

Column 17,
Line 4, please delete "0.5  pKa  14" and insert -- 0.5 $\leq$pKa $\leq$14 -- therefor.

Column 18,
Lines 15-16, please delete "1,6-bis(2,3.epithiopropyldithio)2-(2,3-epithiopropyl-dithioethylthio)4-thiahexane" and insert -- 1,6-bis(2,3-epithiopropyldithio)-2-(2,3-epithiopropyl-dithioethylthio)-4-thiahexane -- therefor.
Line 16, please delete "1,2,3-tis" and insert -- 1,2,3-tris -- therefor.
Line 19, please delete "bis(2,3epthiopropyl)disulfide" and insert -- bis(2,3-epithiopropyl)disulfide -- therefor.
Line 57, please delete "0.5  pKa  14" and insert -- 0.5  $\leq$pKa $\leq$14 -- therefor.

UNITED STATES PATENT AND TRADEMARK OFFICE
CERTIFICATE OF CORRECTION

PATENT NO.    : 6,486,298 B1
DATED         : November 26, 2002
INVENTOR(S)   : Jallouli et al.

It is certified that error appears in the above-identified patent and that said Letters Patent is hereby corrected as shown below:

Column 19,
Line 1, please delete "$A_1 \!-\!\!-\!(CH_2X)_z(IX)$" and insert -- $A_1 \!-\!\!-\!(CH_2X)_z$ (IX) -- therefor.
Line 44, please delete "tie" and insert -- the -- therefor.

Signed and Sealed this

Sixth Day of May, 2003

JAMES E. ROGAN
*Director of the United States Patent and Trademark Office*